US008339276B2

(12) United States Patent
Mandal et al.

(10) Patent No.: US 8,339,276 B2
(45) Date of Patent: Dec. 25, 2012

(54) MONOCONDUCTOR DATA-POWER TRANSMISSION

(75) Inventors: Batakrishna Mandal, Missouri City, TX (US); Clovis Bonavides, Houston, TX (US); Carl Dodge, Houston, TX (US); Syed Ali, Houston, TX (US); Alberto Quintero, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 494 days.

(21) Appl. No.: 12/520,798

(22) PCT Filed: Sep. 7, 2007

(86) PCT No.: PCT/US2007/019604
§ 371 (c)(1),
(2), (4) Date: Dec. 1, 2009

(87) PCT Pub. No.: WO2009/032000
PCT Pub. Date: Mar. 12, 2009

(65) Prior Publication Data
US 2010/0073189 A1     Mar. 25, 2010

(51) Int. Cl.
*G01V 3/00* (2006.01)
(52) U.S. Cl. ............... 340/853.3; 340/854.4; 340/854.6
(58) Field of Classification Search ............... 340/854.4, 340/854.6, 853.3
See application file for complete search history.

(56) References Cited

U.S. PATENT DOCUMENTS

| 5,467,083 | A | * | 11/1995 | McDonald et al. | ........ 340/854.6 |
| 6,041,861 | A | | 3/2000 | Mandal et al. | |
| 6,712,138 | B2 | | 3/2004 | Mandal | |
| 6,937,159 | B2 | * | 8/2005 | Hill et al. | ........ 340/854.4 |

FOREIGN PATENT DOCUMENTS

| GB | 2352150 | 1/2001 |
| GB | 2352321 | 1/2001 |
| WO | WO-2009032000 A1 | 3/2009 |

OTHER PUBLICATIONS

"International Application No. PCT/US2007/019604, International Search Report Mailed Jun. 30, 2008", 3.
"International Application No. PCT/US2007/019604, Written Opinion Mailed Jun. 30, 2008", 8.

* cited by examiner

*Primary Examiner* — Jean B Jeanglaude
(74) *Attorney, Agent, or Firm* — Schwegman Lundberg & Woessner, P.A.

(57) ABSTRACT

Apparatus and systems, as well as methods, operate to acquire downhole data associated with a borehole casing, process a portion of the downhole data at a downhole location to provide processed data, and regulate surface motor power received at a motor downhole. The surface motor power is filtered and the processed data is transmitted to a surface location on a monoconductor that also carries the surface motor power. Additional apparatus, systems, and methods are disclosed.

27 Claims, 7 Drawing Sheets

MONOCONDUCTOR DATA-POWER TRANSMISSION

RELATED APPLICATIONS

This application is a nationalization under 35 U.S.C. 371 of PCT/US2007/019604, filed Sept. 7, 2007 and published as WO 2009/032000 A1 on Mar. 12, 2009, which application and publication are incorporated herein by reference in their entirety and made a part hereof.

BACKGROUND INFORMATION

Fluids (e.g., oil, water, gas) exist in a variety of materials, including geological formations. These fluids are often recovered using a well formed as a borehole cut into the formation. During exploration and recovery operations, data acquisition circuitry is used to acquire and transmit data related to the formation and/or the borehole to a logging facility at the surface.

DETAILED DESCRIPTION

Figure 1A:
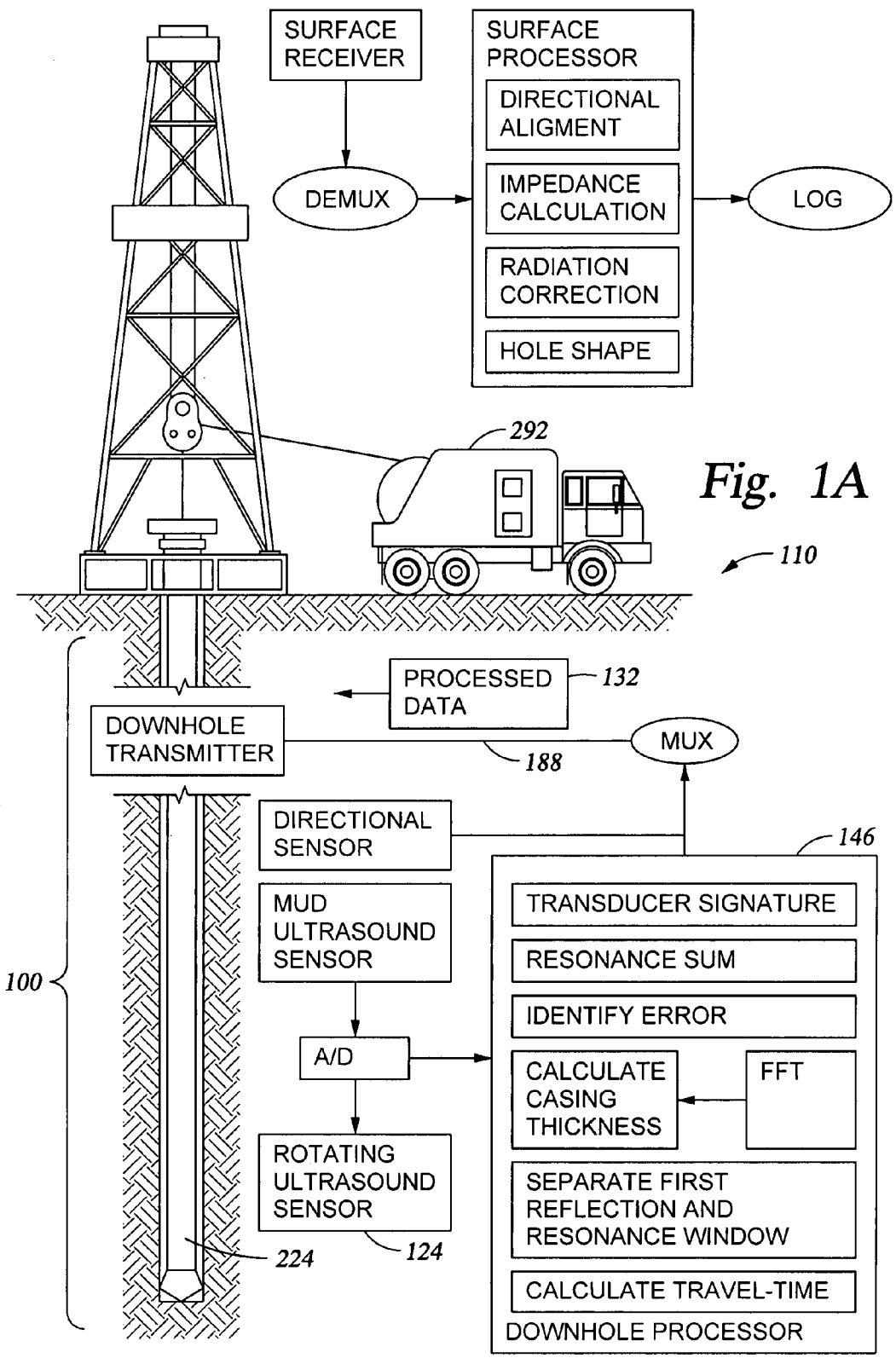
FIG. 1A is a block diagram of an apparatus and system, according to various embodiments of the invention.

During the downhole data acquisition process, motors are used in the borehole to carry out many tasks. When powered near the end of a long cable, the voltage drop across the wires that carry current to a motor can be significant, since motors often use current in proportion to the mechanical loads they support. Thus, the inventors have discovered that abruptly changing mechanical loads can result in correspondingly abrupt changes in the cable supply voltage, both to the motor, and to data acquisition/transmission circuitry powered by the same supply. Downhole cabling that carries data signals may likewise be affected by the resulting electromagnetic noise.

Separating power supplies, or data transmission and power supply conductors from each other, using shielding and/or physical partition schemes, can reduce this type of interference. However, the use of separated multiple conductors adds to the bulk of downhole cabling, rendering operation in boreholes with high wellhead pressure either difficult, or impossible.

While attempting to solve some aspects of this problem, the inventors have discovered that the magnitude of the interference can actually be managed by combining the transmission of data and power onto the same conductor, even though this approach is contraindicated by the conventional wisdom of separating conductors to reduce interference.

Thus, the inventors have discovered that interference created by transmitting data and motor power at the same time may be addressed by acquiring downhole data using a downhole tool body (e.g., downhole tool, probe, or sonde), processing a portion of the downhole data at a downhole location to provide processed data, regulating surface motor power received at a motor downhole, filtering the surface motor power, and transmitting the processed data to a surface location on a monoconductor that also carries the surface motor power.

For the purposes of this document, a "monoconductor" is a conductive device that provides a single transmission path to support forward current flow, and makes use of one or more additional paths for return current flow. Thus, a monoconductor includes cables similar to the mono conductor cable available from Aceros de Camesa, S.A. de C.V. of Mexico, which provides a single cable for forward current flow and outer armor for the return path. Another form of monoconductor includes an insulated slick line with the return provided by conductive borehole casing, borehole fluid, conductive formations, or a combination thereof In most embodiments, the processed data comprises "low-level processed data," which is a telemetry data signal representing less than 30% of the total power present in the monoconductor. This portion of the total power in the monoconductor is consumed by the tool instrumentation in order to process acoustic data downhole and to transmit the processed data using the monoconductor. In many embodiments, the surface motor power comprises "high-level surface motor power," which represents more than 70% of the total power in the monoconductor as the power is delivered to the downhole tool using the monoconductor. This portion of the power may be delivered to a scanner motor in order to rotate a scanning head, such as an ultrasound transducer scanning head, for example. In some embodiments, the distribution of power between the low-level process data and the high-level surface motor power is about 20% and 80%, respectively.

This type of operation can be useful in a number of circumstances, such as when borehole casing and cement inspections are conducted in real-time using a motor-driven (e.g., rotating) ultrasonic transducer on monocable or slickline. Additional improvements include performing acoustic processing algorithms downhole, which helps reduce the amount of transmission bandwidth needed, and reducing motor voltage fluctuations. Assets can usually be more easily deployed, since monoconductor cable is usually less expensive and less bulky than conventional solutions.

FIG. 1A is a block diagram of an apparatus 100 and system 110, according to various embodiments of the invention. In well-site operations, a service company usually operates to acquire data from surface and/or downhole sensors to be stored into a common well-site database. The acquired data may be displayed at the well-site to ensure the quality of data measurement and reliability of the sensors and actuators.

Some downhole data acquisition processes make use of relatively high telemetry data bandwidth. For example, many tens of waveforms per azimuthal scan may be received during ultrasonic transducer inspection of a borehole casing. This data is sent to the surface, where a surface computer processes each waveform to calculate casing thickness and acoustic impedance. Since the disclosed embodiments make use of a monoconductor to transmit both data and power, additional benefits can be obtained if data transmission bandwidth is used more efficiently.

One mechanism that enables better use of the available bandwidth involves processing some of the acquired data downhole to provide a reduced volume of processed data for transmission to the surface. A processor 146, such as a fixed or floating point digital signal processor (DSP) can be installed in the tool body 224 downhole, to manage the acquisition and to process many components of cement bond analysis. The computational results and other information, taking the form of processed data 132, can then be transmitted to the surface where final calculations are completed by a surface processor, perhaps one located in a surface facility 292. While some precision and raw data may be lost, telemetry bandwidth is gained, and data storage requirements downhole are reduced.

Figure 1B:
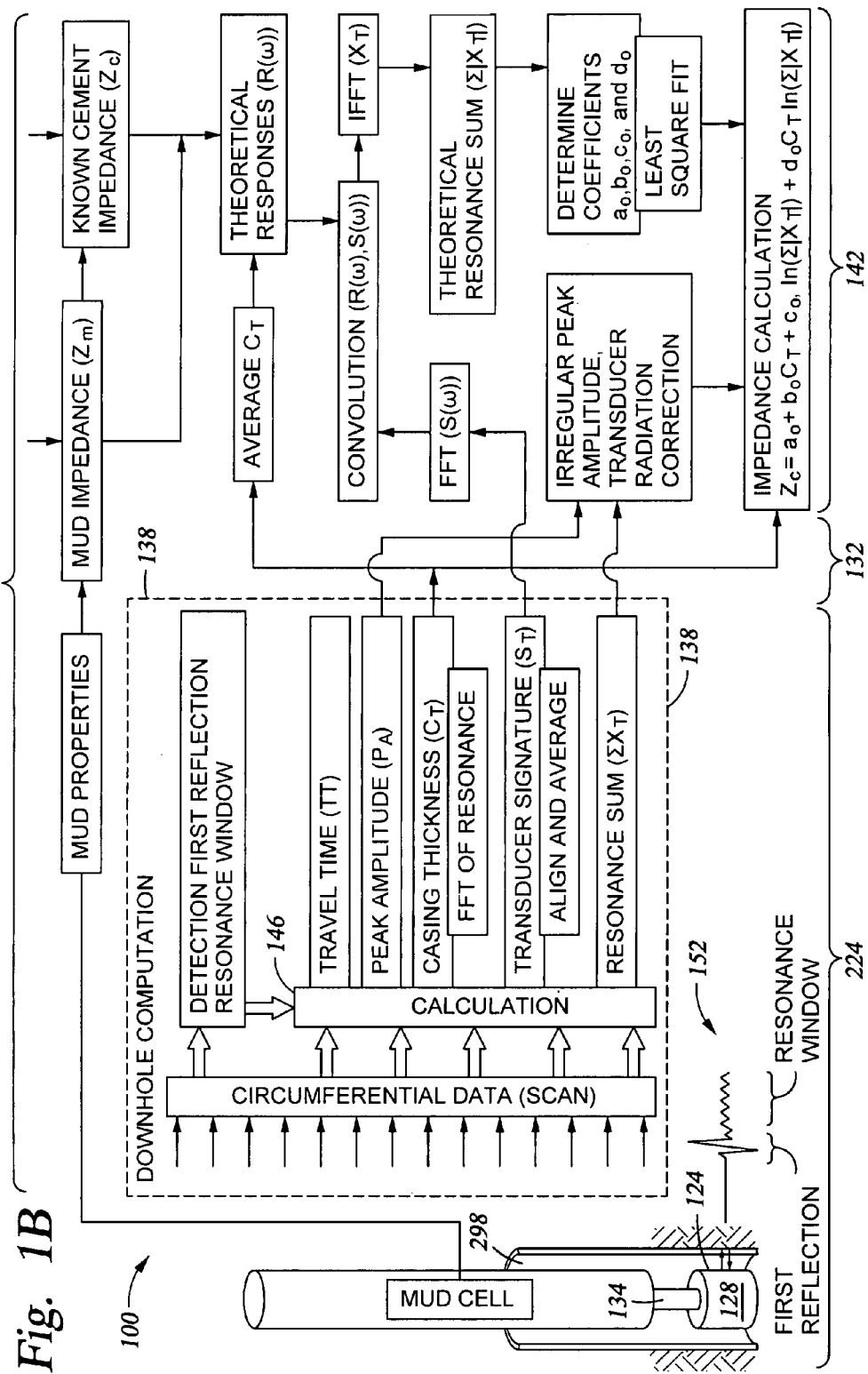
FIG. 1B is a block diagram of data processing operations, according to various embodiments of the invention.

FIG. 1B is a block diagram of data processing operations 120, according to various embodiments of the invention. Here it can be seen that scan-based data acquisition and transmission can save bandwidth, simplify computational tasks, and reduce operational time since less time is used in smaller casings where less shots per scan are needed.

In some embodiments of the apparatus 100, the downhole tool body 224 can be used to acquire data that is obtained using one or more sensors 124, such as an acoustic transducer that rotates by virtue of attachment to a mechanical head 128. If the sensor 124 comprises a transducer, this device may act as both transmitter and receiver (e.g., pulse-echo operation), although pitch-catch operation with a pair of transducers is also possible. Processed data 132 from the tool 224 is sent to the surface based on a synchronous telemetry sampling rate. However, the telemetry transmission is time-based, and not synchronized with the motor 134 and transducer head 128 rotation. Therefore, a new set of processed data 132 (e.g., one set per scan) may not be available when transmission of the previous set is complete.

In order to accommodate these circumstances, the tool 224 can transmit processed data 132 using the format shown in Table I. Other formats are possible. This data 132 can have its own frame design and may start and stop at any place within the number of words (e.g., Total Words=X words+Y words+Z words) assigned. The frame design used for this data 132 may depend on the tool operation mode, logging speed, number of shots/revolution and rotational speed of the scanner head 128.

TABLE I

Processed Data Transmission Format

| Words | Description |
|---|---|
| X words | status data, including communication overhead information, tool status, and tool control |
| Y words | time-based data, including acoustic data received from transducers that includes monitoring waveforms and auxiliary channels |
| Z words | scan-based data, including acoustic transducer data that depends on the tool operation mode, logging speed, number of shots/revolution, and scanner head rotational speed |

With the format shown in Table I, each set of processed data 132 can be transmitted in an uninterrupted manner, saving bandwidth and simplifying computational tasks. If there is no new data 132 available when transmission of a particular set is complete, then zeros can be transmitted until a new scan is finished, and a new set of data 132 is available. Some embodiments may operate to send the previous data frame instead, or any type of pre-determined digital information. This can occur when the transducer head 128 spins slowly relative to the telemetry request rate. This concept for data transmission is independent of time-based transmission, and simplifies downhole memory management.

Another mechanism for increasing efficiency is that of an auto-calibration cement impedance algorithm. Here the algorithm is divided into portions, so that a first portion 138 is accomplished downhole, and a second portion 142 is accomplished at the surface. The first portion 138 may be performed by a processor 146, such as a DSP. Significant reductions of the telemetry bandwidth used to transmit processed data 132 can result. Thus, some embodiments include implementing a self-calibrated impedance algorithm using a downhole processor 146 to reduce the amount of processed data that is transmitted to the surface.

Figure 1C:
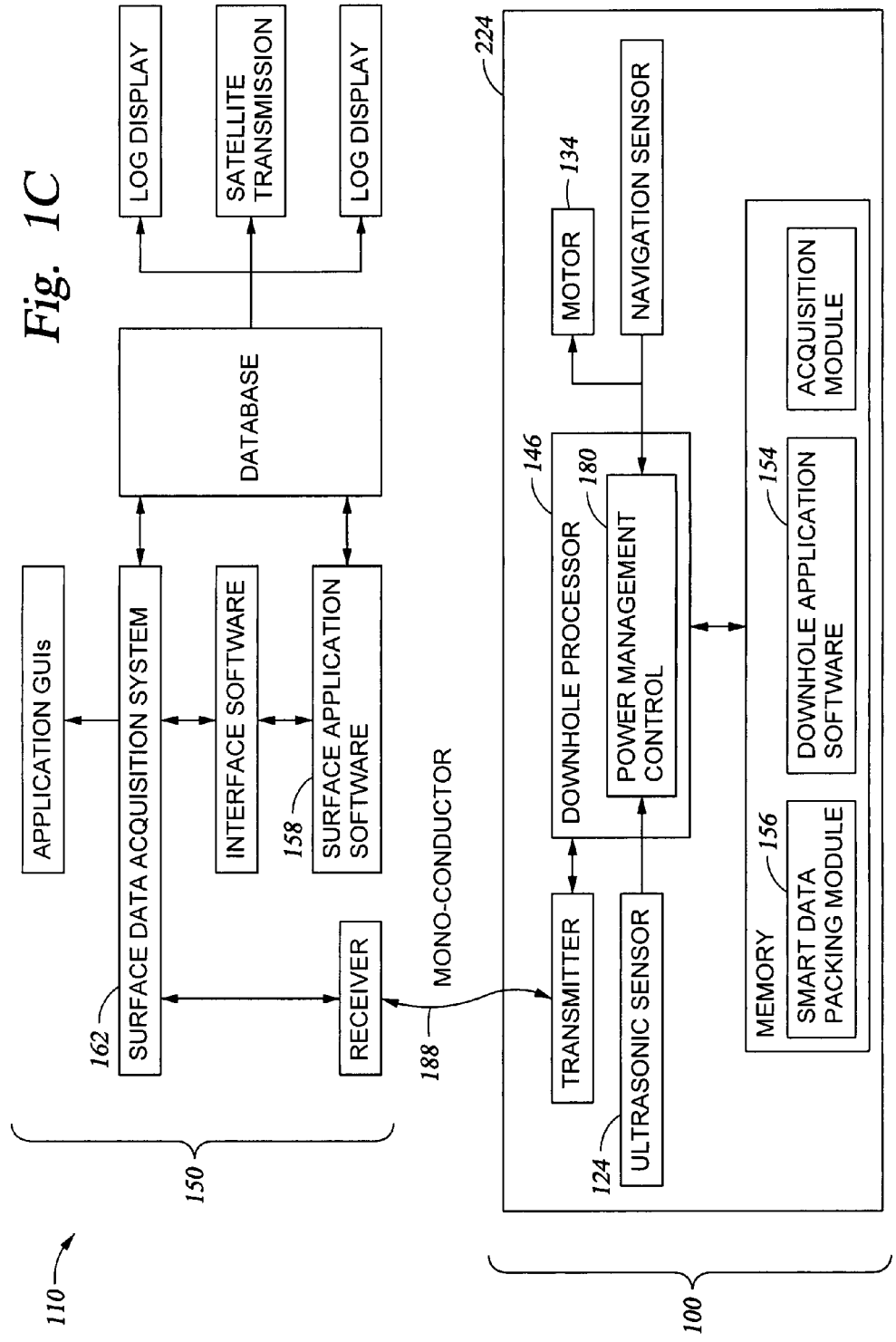
FIG. 1C is a block diagram of an apparatus and system, according to various embodiments of the invention.

FIG. 1C is a block diagram of an apparatus 100 and system 110, according to various embodiments of the invention. The embodiments illustrated in this case shows the separation between the downhole apparatus 100, and the surface components 150 that combine to make up the system 110. In this implementation the downhole and surface application software 154, 158 are linked through a surface data acquisition system 162. The surface data acquisition system 162 may exist as an independent module connected through an interface module 164 to surface application software 158.

Figure 1D:
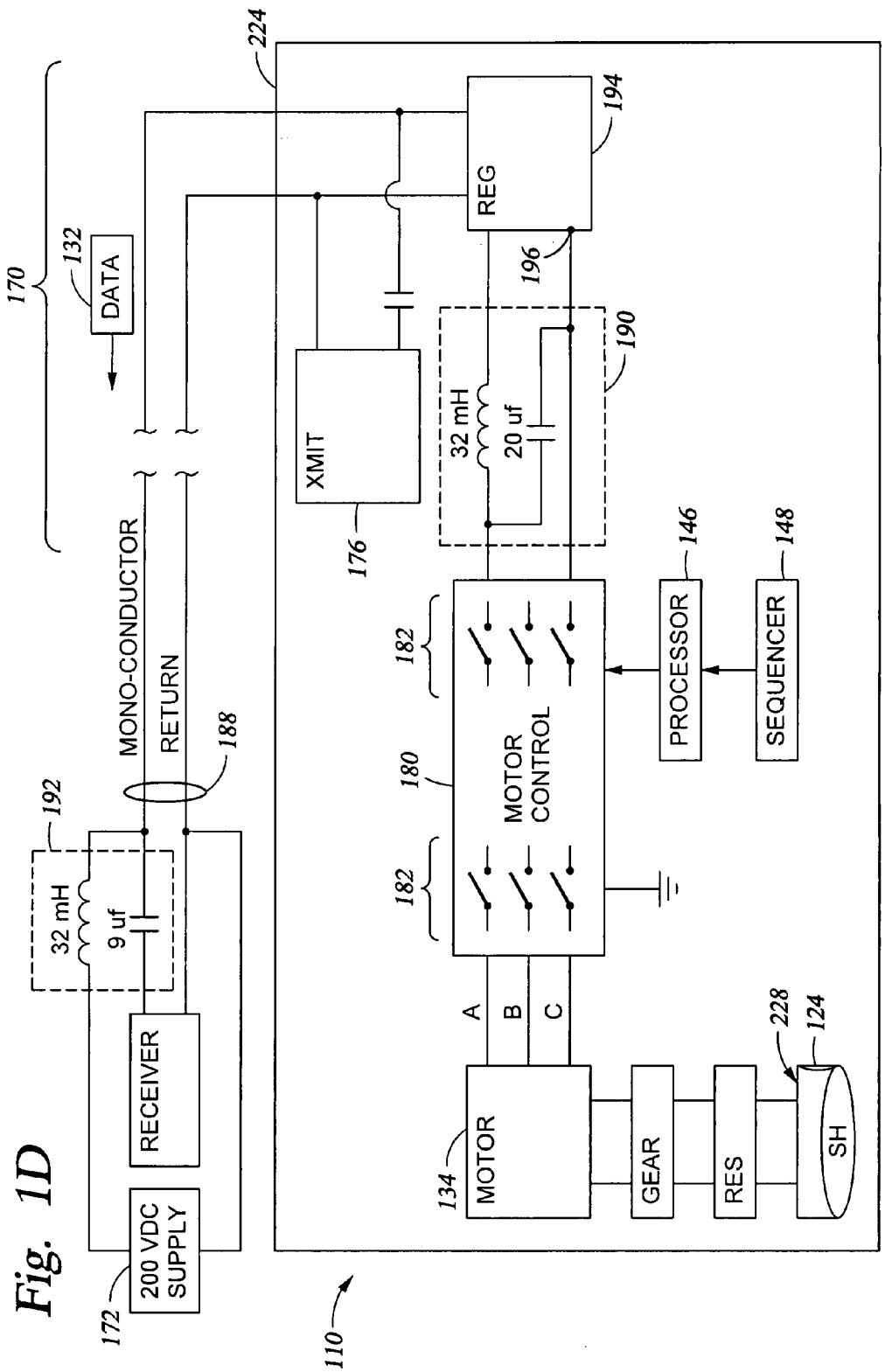
FIG. 1D is a block diagram of filtering and regulation components, according to various embodiments of the invention.

FIG. 1D is a block diagram of filtering and regulation components 170, according to various embodiments of the invention. Here the system 110 is shown to include a downhole tool body 224 that is used to house the various components of the apparatus 100, shown in FIGS. 1A-1C).

The surface motor power supply 172 in this embodiment provides 200 VDC to the motor 134, located downhole. This supply 172 is available for both instrumentation (e.g., the downhole processor 146) and the motor 134. Since it is desirable to maintain the voltage provided by the supply 172 as a substantially constant voltage, the speed of the motor 134 should be closely regulated so that motor control and power distribution functions can be achieved simultaneously, without interfering with the transmission of processed data 132.

As shown in FIG. 1D, the power supply mechanism includes the use of a motor 134 (e.g., a brushless DC motor) that shares the surface motor power source, supply 172, with instrumentation, such as the processor 146 and the transmitter 176. The speed of the motor 134 is controlled by using the motor shaft to drive a reduction drive GEAR, perhaps with a reduction ratio of 16:1 or 10:1 or 5:1 to increase torque and more easily maintain a substantially constant sensor 124 rotation speed. The output shaft of the reduction drive GEAR is connected to the mechanical head 128 that contains one or more sensors 124. This design makes the head 128 more resistant to motor speed variations due to changes in downhole fluid properties.

The motor control 180 operates to sense back-electromotive force (EMF) in non-energized windings on the motor 134 to control the supply of power to the motor 134. For example, assume the motor 134 has three windings: A, B, and C. At any time during the commutation sequence, two of the three windings are connected in series between the 200 VDC supply and the 200 VDC return lines. Switches 182 in the motor control 180 are activated by hardware in the control 180 and sequencer firmware 148 accessed by the downhole processor 146 to make current flow through selected pairs of the motor windings A-B, B-C, and A-C. One possible commutation sequence is shown in Table II. Other sequences may be used.

TABLE II

Commutation Sequence

| 200 VDC Winding | 200 VDC Winding RTN | State | Open Winding |
|---|---|---|---|
| A | C | 1 | B |
| B | C | 2 | A |
| B | A | 3 | C |

TABLE II-continued

Commutation Sequence

| 200 VDC Winding | 200 VDC Winding RTN | State | Open Winding |
|---|---|---|---|
| C | A | 4 | B |
| C | B | 5 | A |
| A | B | 6 | C |

A single commutation cycle may include cycling through the six states shown in Table II, so that the current supplied to the motor 134 in this fashion causes the motor to advance in one direction. In some embodiments, an eight pole motor 134 makes a complete revolution every sixteen commutation cycles. The switches 182 connect and disconnect each motor winding A, B, C to either the 200 VDC supply, or the 200 VDC return. The switches 182 change state based on a signal measured in the non-energized winding (e.g., induced voltage or back-EMF).

A signal conditioning circuit (not shown) including a low pass filter and a comparator is connected across each motor winding A, B, C and ground so that the back-EMF in non-energized windings can be detected. The comparator output is fed to sequencer firmware 148 accessible to the processor 146 to detect back-EMF zero-crossing times. At these times, the commutation cycle may include changing from one state to the next, as shown in Table II. The speed of the motor 134 should thus be approximately proportional to the magnitude and slope of the back-EMF signal that is detected.

An inductive-capacitive (LC) filter 190 can be located downhole, proximate to the motor control 180, and coupled to the 200 VDC supply line, which can take the form of a monoconductor 188 (e.g., an armored monocable, or a slick line with conductive borehole casing used as a return). The filter 190 operates to condition power supplied to downhole instrumentation, and to reduce noise generated by the motor 134 so that it does not interfere with the transmission of downhole processed data 132 to the surface or with the reception of surface commands to the downhole tool. A second LC filter 192 is located proximate to the surface system, such as between the surface power supply 172 and the surface receiver or telemetry panel. This filter 192 operates to separate and isolate processed data being received at surface from surface power signals.

Power regulation can be used to absorb variations in the power supplied to the motor an instrumentation by the monoconductor 188. In this way, voltage fluctuations in the monoconductor 188 caused by motor torque fluctuations can be regulated. Thus, a downhole power regulator 194 (e.g., shunt regulator or voltage regulator), connected across the monoconductor 188 and return lines, reduces the likelihood of sudden voltage changes across the monoconductor 188. This is most useful when starting the motor 134 under load, due to the initial high current (peak) demand.

The downhole sequencer firmware 148 defines the commutation cycle and its timing using pulse width modulation (PWM), perhaps chopping the 200VDC supply signal at a frequency of about 32 KHz. The chopping frequency duty cycle controls the time that the switches 182 remain ON. As the ON time becomes longer, the effective voltage applied to the motor 134 increases proportionally. Thus the speed of the motor 134 can be controlled by controlling the duty cycle, or ON time of the PWM supply signal. Thus, in some embodiments, 100% ON time will provide an effective voltage of 200VDC to the windings A, B, C, of the motor 134, with maximum sensor 124 rotational speed, while 50% duty cycle will result in 100 VDC effectively voltage applied across the motor windings A, B, C, resulting in approximately one-half the maximum sensor 124 rotational speed.

A human operator or the surface software 158 can be used to provide a desired motor speed by issuing a command signal to the motor control 180 in the downhole tool body 224. In most cases, the motor control 180 will operate to start rotating the motor 134 using a gradually increasing supply voltage ramp until the desired speed is obtained. Gradual motor acceleration tends to provide a relatively constant voltage drop across the monoconductor 188 that is easily controlled by the power regulator 194 (e.g., voltage or shunt regulator).

When the desired speed is achieved, a closed feedback loop can then be used to maintain the speed. The closed loop may comprise measuring the actual speed of the motor 134, perhaps using a sine-cosine resolver RES connected to the output of the reduction drive GEAR or drive shaft to which sensors 124 are mounted. The error between the desired speed and actual speed is calculated, and a proportional integral derivative (PID) controller can be used to amplify the speed error and dynamically adjust the PWM duty cycle. This method of operation contributes to a smoothly running motor 134, greatly reducing errors in the processed data sent to the surface while the motor 134 operates from the supply 172.

The new generation of ultrasonic scanning tools uniquely provide user-programmable data acquisition parameters. This makes the tool operation configurable via software commands. After entering the casing size, for example, the surface software 158 may be used to calculate the desired rotational speed for the scanner head 128 and the number of shots the sensor 124 (e.g., transducer) that will be fired per revolution, or scan cycle. This is useful since for the same degree of coverage a pipe with small ID requires a smaller number of shots than a pipe with large ID. At this point, bandwidth limitations can be considered, and various algorithms can be applied to determine the best data transmission format for the desired logging speed. All these parameters can be determined with the use of computer software. Once this process is completed, the instrumentation in the downhole tool body 224 can be configured by transmitting the parameters to the tool.

As part of the processed data 132, mud cell and long waveform data can be transmitted to the surface, perhaps for continuous display by the system 110, providing monitoring capabilities to the surface operator. This information, which may be sent in compressed form, perhaps after processing by a data compression module 156, may be updated on a periodic basis, so that a system user (e.g., logging engineer) can monitor and determine in real-time that the downhole tool body 224 is working as expected, and that selected sensors are providing quality data.

Word slicing can be used to efficiently format processed data for transmission to the surface. For example, five twelve-bit measurements and a control byte can be formatted as four sixteen-bit words. This particular example is presented in Table III below. Other arrangements are possible. In this case, five measurements or calculated values (ultrasonic wave travel time to first reflection, ultrasonic wave amplitude, casing thickness vector, a peak amplitude index, and a resonance sum vector, such as the absolute sum of multiple resonance window cycles) and a control byte are transmitted using four 16-bit words (W1 to W4) . Word slicing thus can be implemented to create a very efficient utilization of available bandwidth, since every available bit may be used. Another mechanism for saving "expensive" bandwidth is to reduce the amount of bits to that which is sufficient to transmit relevant information, perhaps based on the resolution desired. For instance, a signal that is expected to be around 3.3V +/−0.3V can be measured using 6 bits to provide 10 mV resolution. In this case, excursions above 3.6V can be coded as 111111 and below 3.0V can be coded as 000000.

TABLE III

Word Slice Frame

| Word | Description | Data Bits | Total Bits |
|---|---|---|---|
| W1 | Travel Time | 12 | |
| W1 | Amplitude | 4 | 16 |
| W2 | Amplitude | 8 | |
| W2 | Thickness Vector | 8 | 16 |
| W3 | Thickness Vector | 4 | |
| W3 | Peak Amplitude Index | 12 | 16 |
| W4 | Resonance Sum Vector | 12 | |
| W4 | Control Byte | 4 | 16 |

Thus, many embodiments may be realized. For example, in some embodiments, an apparatus 100 may comprise a downhole tool body 224 that includes a motor 134 to receive surface motor power from a monoconductor 188. The apparatus 100 further includes a processor 146 to provide processed data 132 and a filter coupled to the motor 134. The filter may comprise a pair of LC filters 190, 192 coupled to opposite ends of the monoconductor 188.

The apparatus 100 may also include a power regulator 194 coupled to the filter. In the embodiment shown, the surface motor power is provided to the motor 134 using a monoconductor terminal 196 of the power regulator 194. The processed data 132 is transmitted along the monoconductor 188 by coupling the processed data 132 to the monoconductor 188 so that the surface motor power can be applied to operate the motor 134 at substantially the same time the processed data 132 is transmitted on the monoconductor 188. In some embodiments, the downhole tool body 224 comprises a data compression module 156 to provide at least a portion of the processed data 132.

Many apparatus 100 further include one or more sensors 124, such as an ultrasound transducer, to couple to the motor 134 and to acquire downhole data (e.g., raw ultrasound waveforms). The sensors 124 can be coupled to the processor 146, either directly or indirectly, so that the processed data 132 can be derived from at least a portion of the acquired downhole data. The motor 134 may be coupled to a reduction drive having a reduction ratio of greater than about 10:1 to couple the motor 134 to the sensor(s) 124. Thus, the apparatus 100 may include a rotatable sensor 124, such as an ultrasonic transducer coupled to the motor 134 using a reduction drive GEAR (e.g., a gear box).

As noted previously, the apparatus 100 may include a motor controller 180 to measure back-EMF as an indication of the motor velocity. The controller 180 can also provide PWM drive to adjust the motor velocity. Still further embodiments may be realized.

Figure 2:
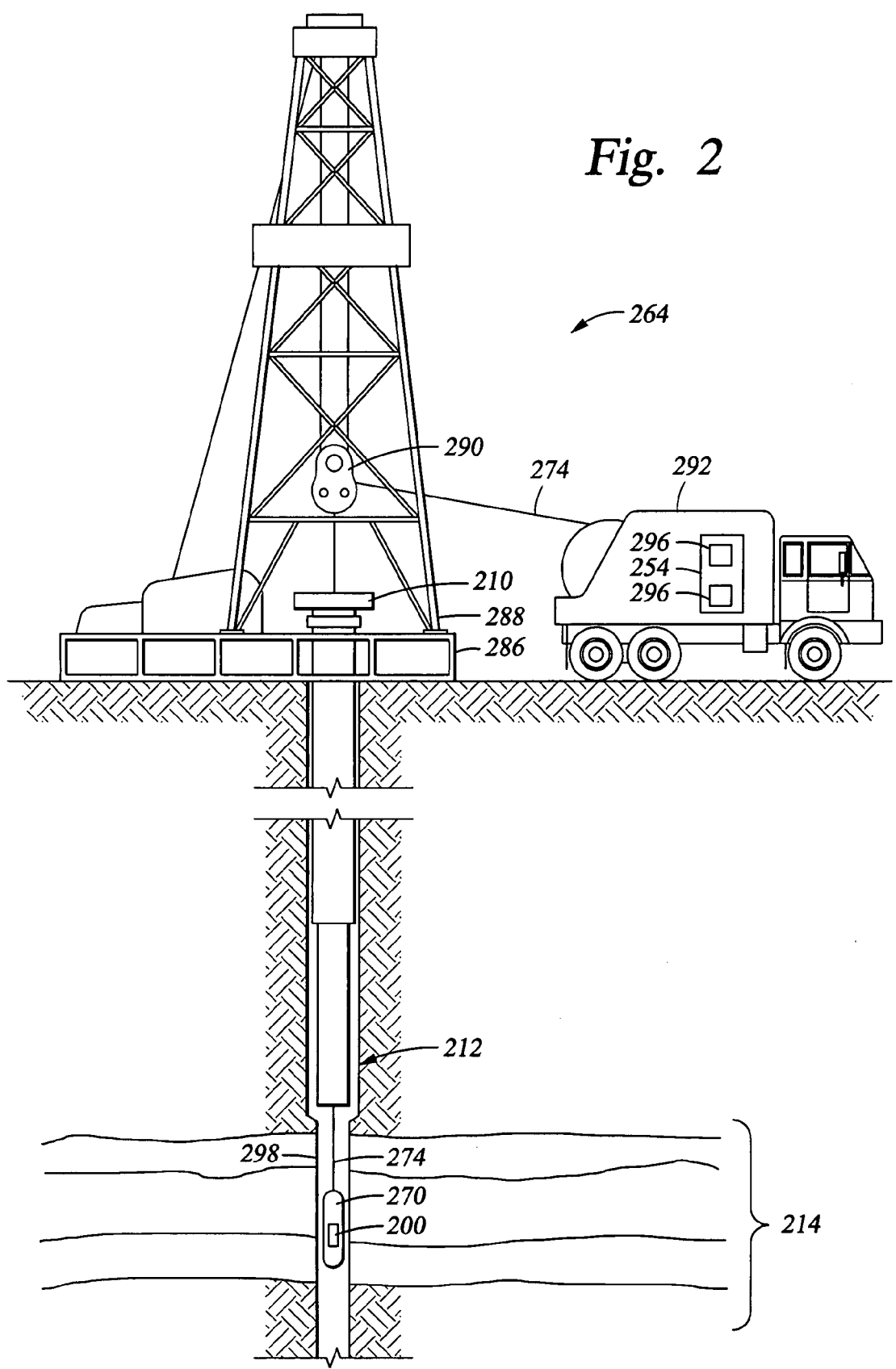
FIG. 2 illustrates apparatus and systems in a logging environment, according to various embodiments of the invention.

For example, FIG. 2 illustrates apparatus 100 and systems 110 in a logging environment, according to various embodiments of the invention. The apparatus 100 may comprise portions of a downhole tool body 224 as part of a wireline logging operation. Here a drilling platform 286 is shown equipped with a derrick 288 that supports a hoist 290.

Drilling oil and gas wells is commonly carried out using a string of drill pipes connected together so as to form a drilling string that is lowered through a rotary table 210 into a wellbore or borehole 212. Here it is assumed that the drilling string has been temporarily removed from the borehole 212 to allow a tool body 224 (e.g., a wireline logging tool, probe, or sonde) to be lowered by a monoconductor 188 into the borehole 212. Typically, after the casing has been put in place and the well has been cemented, the tool body 224 is lowered to the bottom of the region of interest and subsequently pulled upward at a substantially constant speed. During the upward trip, instruments included in the tool body 224 (e.g., apparatus 100) may be used to perform measurements on the subsurface formations 214 adjacent the borehole 212, and/or the borehole casing 298 as they pass by. The processed data 132 can be communicated to a logging surface facility 292 for storage, processing, and analysis. The logging surface facility 292 may be provided with electronic equipment (e.g., surface components 150 of FIG. 1C) for various types of signal processing (e.g., the second portion 142 of FIG. 1B). The tool body 224 in this case may house portions of one or more apparatus 100, and the logging facility 292 may include one or more surface computers 254, including the surface processor of FIG. 1A.

Many embodiments may be realized. For example, in some embodiments, a system 110, such as a monocable or slickline logging system, includes a surface facility 292 to provide surface motor power and to receive processed data 132, a monoconductor 188 to couple to the surface facility 292, and a downhole tool body 224 including a motor 134 to receive the surface motor power from the monoconductor 188. A downhole processor, filter, and power regulator may also be included in the system 110, as described previously. The system 110 may also include a display 296 to display at least a portion of the processed data 132.

The apparatus 100; systems 110; data processing operations 120; sensors 124; head 128; processed data 132; motor 134; first portion 138; second portion 142; processor 146; sequencer firmware 148; surface components 150; application software 154, 158; data compression module 156; surface data acquisition system 162; interface module 164; shunt regulator components 170; surface motor power supply 172; transmitter 176; motor control 180; switches 182; monoconductor 188; filters 190, 192; downhole regulator 194; rotary table 210; borehole 212; subsurface formations 214; downhole tool body 224; surface computers 254; drilling platform 286; derrick 288; hoist 290; surface facility 292; reduction drive GEAR; resolver RES; and windings A, B, C may all be characterized as "modules" herein.

Such modules may include hardware circuitry, and/or a processor and/or memory circuits, software program modules and objects, and/or firmware, and combinations thereof, as desired by the architect of the apparatus 100 and systems 110, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling and logging or even oilfield operations, and thus, various embodiments are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as process measurement instruments, personal computers, workstations, and vehicles, among others. Some embodiments include a number of methods.

Figure 3:
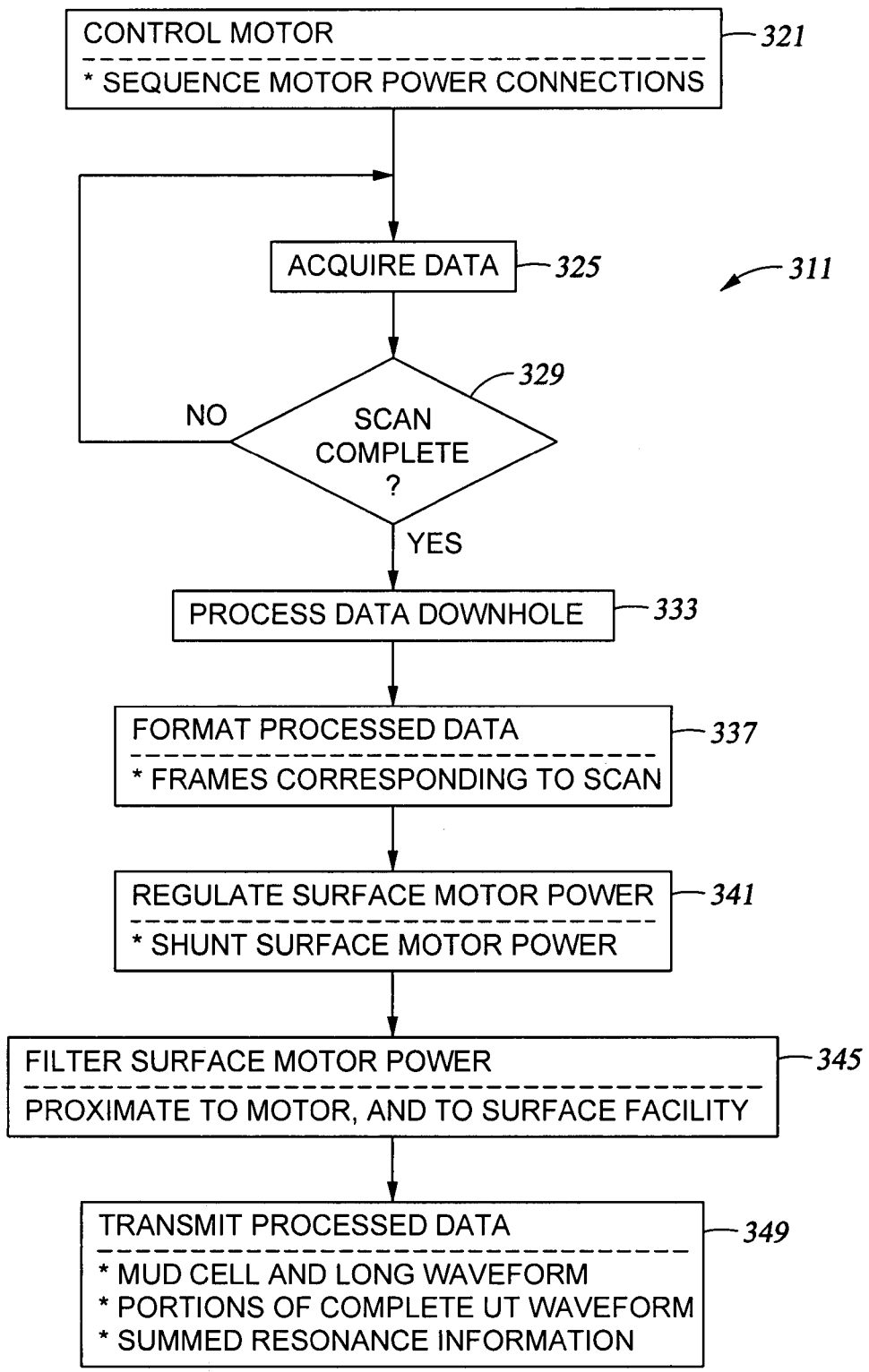
FIG. 3 is a flow diagram of several methods according to various embodiments of the invention.

For example, FIG. 3 is a flow diagram of several methods 311 according to various embodiments of the invention. In some embodiments of the invention, a method 311, such as a method that permits substantially simultaneous data transmission and power provision, begins at block 321 with controlling a motor coupled to a sensor, such as an ultrasound transducer, by driving the sensor along an azimuthal or helical scan path with a speed determined in part by PWM of the surface motor power, and in part by measured back-EMF associated with non-powered windings of the motor to determine a winding excitation sequence.

Thus, controlling the motor may include sequencing connection of the surface motor power to the motor according to a measured back-EMF associated with non-powered windings of the motor. The surface motor power may comprise any kind of substantially regular discontinuous direct current, including PWM, a rectified sine wave, etc.

The method 311 may continue at block 325 with acquiring downhole data associated with a borehole casing and/or underground formations. At this point, if the scan is not complete, as determined at block 329, the method 311 includes returning to block 325 to acquire additional data.

If it is determined that the scan is complete at block 329, then the method 311 may include processing a portion of the downhole data at a downhole location to provide processed data at block 333. The method 311 may continue on to block 337 with formatting the processed data, to include formatting the processed data into frames having a one-to-one correspondence with individual azimuthal or helical scan operations associated with acquiring the data. Thus, the method 311 may include formatting the processed data into a transmission frame on a per-scan basis associated with the activity of acquiring the data.

The method 311 may go on to block 341 with regulating surface motor power received at a motor downhole. As noted previously, regulation may include shunting the surface motor power.

The method 311 may continue with filtering the surface motor power at block 345. Filtering may comprise filtering the surface motor power proximate to the motor, and filtering the surface motor power proximate to a surface facility providing the surface motor power. The method 311 may terminate with transmitting the processed data to a surface location on a monoconductor that carries the surface motor power at block 349.

The processed data transmitted to the surface may include a number of components. For example, mud cell information and long waveform information may be included. Thus, the activity of transmitting may comprise periodically transmitting mud cell information and long waveform information as a measure of quality associated with the activity of acquiring data and as an aid to monitor the correct functionality of the downhole equipment.

Transmitting processed data may also include transmitting different portions of a substantially complete ultrasonic waveform as part of different helical borehole scans. For example, long waveforms may be divided into segments, so that different segments of the same waveform are sent to the surface as part of different helical scan data sets. In some embodiments, the processed data that is transmitted comprises self-calibrating transducer information 152 (see FIG. 1B) associated with time-windowed ultrasonic signal resonance information forming a portion of the downhole data. The processed data may also include well casing thickness information and/or transducer signature information, as well as a summed version of time-windowed ultrasonic signal resonance information included in the downhole data. Those readers that desire further information on the various components that may be included in processed data are encouraged to consult U.S. Pat. Nos. 6,041,861 and 6,712,138, incorporated herein by reference in their entirety.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received, and perhaps stored using a variety of media, tangible and intangible, including one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand that various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 4:
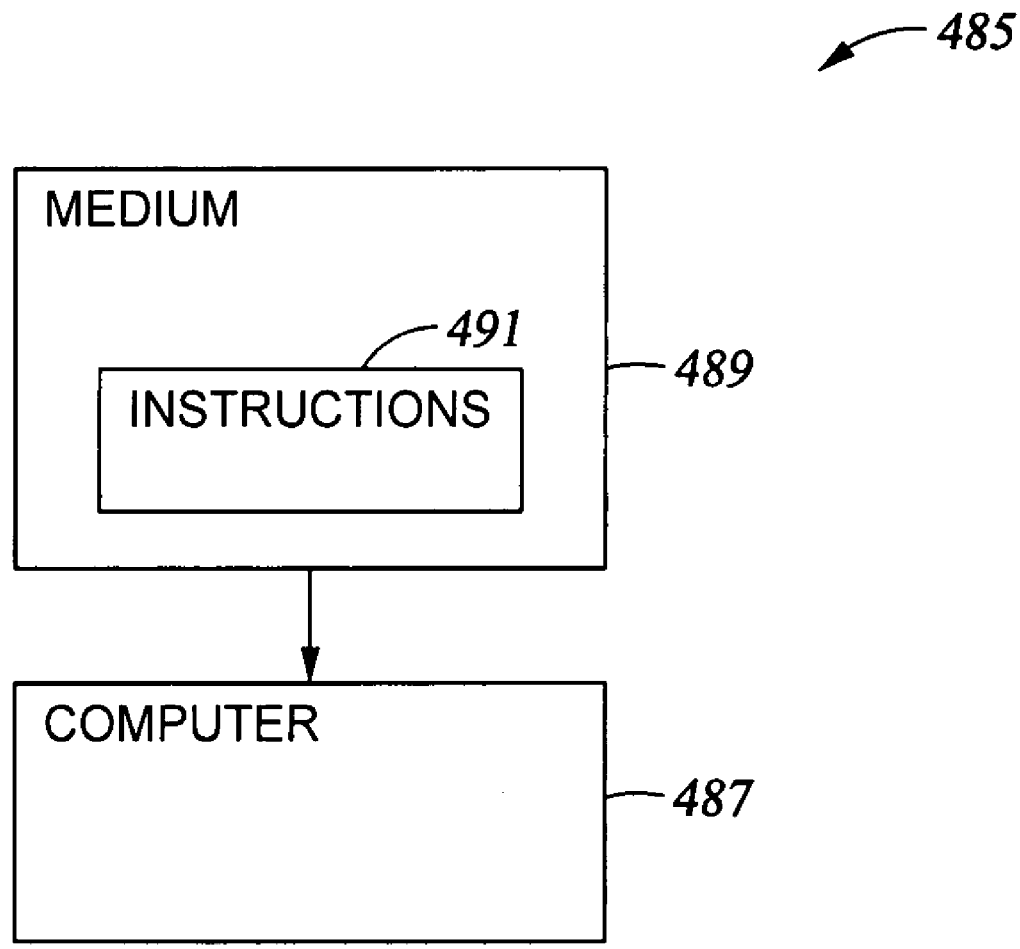
FIG. 4 is a block diagram of an article according to various embodiments of the invention.

FIG. 4 is a block diagram of an article of manufacture, or article 485 according to various embodiments of the invention. Such articles 485 include a computer, a memory system, a magnetic or optical disk, some other storage device, and/or any type of electronic device or system. The article 485 may include a processor 487 coupled to a computer-readable medium such as a memory 489 (e.g., fixed and removable storage media, including tangible memory having electrical, optical, or electromagnetic conductors) having associated information 491 stored thereon (e.g., computer program instructions and/or data), which when executed by a computer, causes the computer (e.g., the processor 487) to perform a method that includes acquiring downhole data associated with a borehole casing, processing a portion of the downhole data at a downhole location to provide processed data, regulating surface motor power received at a motor downhole, filtering the surface motor power, and transmitting the processed data to a surface location on a monoconductor that carries the surface motor power.

Additional activities include sequencing connection of the surface motor power to the motor according to a measured back-EMF associated with non-powered windings of the motor, formatting the processed data into frames having a one-to-one correspondence with individual helical scan operations associated with the activity of acquiring data, and transmitting, as a part of the processed data, a summed version of time-windowed ultrasonic signal resonance information included in the downhole data.

Implementing the apparatus, systems, and methods of various embodiments may provide the ability to acquire data, such as borehole ultrasound data used to conduct casing inspection and cement bond analysis, in situations where it was previously not possible to do so. This includes situations where the borehole is of an especially small diameter, or when high-bandwidth telemetry is desired.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a downhole tool body including a motor to receive surface motor power from a monoconductor;
a processor to provide processed data;
a filter coupled to the motor; and
a power regulator coupled to the filter, wherein the surface motor power is to be provided to the motor using a monoconductor terminal of the power regulator, and wherein the processed data is to be transmitted along the monoconductor by coupling the processed data to the monoconductor so that the surface motor power can be applied to operate the motor at substantially the same time the processed data is transmitted on the monoconductor.

2. The apparatus of claim 1, wherein the monoconductor comprises one of a monocable and an insulated slick line.

3. The apparatus of claim 1, comprising:
a sensor to couple to the motor and to acquire downhole data to couple to the processor, wherein the processed data is to be derived from at least a portion of the downhole data.

4. The apparatus of claim 1, comprising:
a reduction drive having a ratio of greater than 10:1 to couple the motor to the sensor.

5. The apparatus of claim 1, wherein the power regulator comprises a shunt regulator.

6. The apparatus of claim 1, comprising:
a motor controller to measure back-electromotive force as an indication of velocity of the motor.

7. The apparatus of claim 6, wherein the motor controller is to provide pulse-width modulation to adjust the velocity.

8. A system, including:
a surface facility to provide surface motor power and to receive processed data;
a monoconductor to couple to the surface facility;
a downhole tool body including a motor to receive the surface motor power from the monoconductor;
a processor to provide processed data;
a filter coupled to the motor; and
a power regulator coupled to the filter, wherein the surface motor power is to be provided to the motor using a monoconductor terminal of the power regulator, and wherein the processed data is to be transmitted along the monoconductor by coupling the processed data to the monoconductor so that the surface motor power can be applied to operate the motor at substantially the same time the processed data is transmitted on the monoconductor.

9. The system of claim 8, wherein the filter comprises a pair of inductor-capacitor filters coupled to opposite ends of the monoconductor.

10. The system of claim 8, wherein the downhole tool comprises a data compression module to provide at least a portion of the processed data.

11. The system of claim 8, comprising:
a display to display at least a portion of the processed data.

12. The system of claim 8, comprising:
a rotatable ultrasonic transducer coupled to the motor using a reduction drive.

13. A method, comprising:
acquiring downhole data associated with a borehole casing;
processing a portion of the downhole data at a downhole location to provide processed data;
regulating surface motor power received at a motor downhole;
filtering the surface motor power; and
transmitting the processed data to a surface location on a monoconductor that carries the surface motor power.

14. The method of claim 13, comprising:
prior to the transmitting, formatting the processed data into a transmission frame on a per-scan basis associated with the acquiring.

15. The method of claim 13, wherein the regulating comprises:
shunting the surface motor power.

16. The method of claim 13, wherein the filtering comprises:
filtering the surface motor power proximate to the motor; and filtering the surface motor power proximate to a surface facility providing the surface motor power.

17. The method of claim 13, wherein the transmitting comprises:
periodically transmitting mud cell information and long waveform information as a measure of quality associated with the acquiring.

18. The method of claim 13, wherein the transmitting comprises:
transmitting different portions of a substantially complete ultrasonic waveform as part of different helical borehole scans.

19. The method of claim 13, comprising:
controlling a motor coupled to an ultrasound sensor by driving the transducer along a helical scan path with a speed determined in part by pulse-width modulation of the surface motor power, and in part by measured back-electromotive force associated with non-powered windings of the motor to determine a winding excitation sequence.

20. The method of claim 13, wherein the monoconductor comprises one of a monocable and an insulated slick line.

21. The method of claim 13, wherein the processed data comprises self-calibrating transducer information associated with time-windowed ultrasonic signal resonance information forming a portion of the downhole data.

22. The method of claim 13, wherein the surface motor power comprises substantially regular discontinuous direct current.

23. A non-transitory computer-readable medium having instructions stored thereon which, when executed by a computer, cause the computer to perform a method comprising:

acquiring downhole data associated with a borehole casing;
processing a portion of the downhole data at a downhole location to provide processed data;
regulating surface motor power received at a motor downhole;
filtering the surface motor power; and
transmitting the processed data to a surface location on a monoconductor that carries the surface motor power.

24. The computer-readable medium of claim 23, wherein the processed data comprises at least one of well casing thickness information and transducer signature information.

25. The computer-readable medium of claim 23, wherein the instructions, when executed by the computer, cause the computer to perform the method, comprising:
sequencing connection of the surface motor power to the motor according to a measured back-electromotive force associated with non-powered windings of the motor.

26. The computer-readable medium of claim 23, wherein the instructions, when executed by the computer, cause the computer to perform the method, comprising:
formatting the processed data into frames having a one-to-one correspondence with individual helical scan operations associated with the acquiring.

27. The computer-readable medium of claim 23, wherein the instructions, when executed by the computer, cause the computer to perform the method, comprising:
transmitting, as a part of the processed data, a summed version of time-windowed ultrasonic signal resonance information included in the downhole data.

* * * * *